US008010910B2

(12) United States Patent
Wright et al.

(10) Patent No.: US 8,010,910 B2
(45) Date of Patent: Aug. 30, 2011

(54) BREADCRUMB LIST SUPPLEMENTING FOR HIERARCHICAL DATA SETS

(75) Inventors: Dawn Wright, Seattle, WA (US);
Shama Joshi, Bellevue, WA (US);
Samuel Wan, Seattle, WA (US); Aaron Jasinski, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 843 days.

(21) Appl. No.: 11/899,020

(22) Filed: Sep. 4, 2007

(65) Prior Publication Data

US 2009/0063547 A1    Mar. 5, 2009

(51) Int. Cl.
*G06F 3/00* (2006.01)
(52) U.S. Cl. .......... 715/854; 715/853; 715/855; 715/738
(58) Field of Classification Search .................. 715/817, 715/818, 819, 820, 853, 854, 855, 733, 738, 715/764, 765, 810, 841; 707/102
See application file for complete search history.

(56) References Cited

U.S. PATENT DOCUMENTS

| 5,559,945 | A | | 9/1996 | Beaudet et al. |
| 5,675,752 | A | | 10/1997 | Scott et al. |
| 5,806,077 | A | * | 9/1998 | Wecker ........................ 715/236 |
| 5,905,498 | A | | 5/1999 | Diament |
| 6,040,829 | A | | 3/2000 | Croy et al. |
| 6,112,201 | A | | 8/2000 | Wical |
| 6,233,726 | B1 | | 5/2001 | Bowman et al. |
| 6,341,280 | B1 | | 1/2002 | Glass et al. |
| 6,348,935 | B1 | | 2/2002 | Malacinski et al. |
| 6,381,611 | B1 | | 4/2002 | Roberge et al. |
| 6,484,190 | B1 | | 11/2002 | Cordes et al. |
| 6,489,968 | B1 | | 12/2002 | Ortega et al. |
| 6,631,496 | B1 | | 10/2003 | Li et al. |
| 6,633,316 | B1 | * | 10/2003 | Maddalozzo et al. ........ 715/854 |
| 6,636,250 | B1 | | 10/2003 | Gasser |
| 6,785,667 | B2 | | 8/2004 | Orbanes et al. |
| 7,017,123 | B2 | | 3/2006 | Chickles et al. |
| 7,080,326 | B2 | | 7/2006 | Molander et al. |
| 7,099,946 | B2 | | 8/2006 | Lennon et al. |
| 7,197,701 | B2 | | 3/2007 | Hofmann |

(Continued)

FOREIGN PATENT DOCUMENTS

KR    20000018242 A1    4/2000

(Continued)

OTHER PUBLICATIONS

International Search Report from related PCT Application No. PCT/US2008/073900 dated Jan. 28, 2009.

(Continued)

*Primary Examiner* — Xiomar Bautista

(57) ABSTRACT

A breadcrumb path for use in navigating a hierarchical data set may be supplemented with one or more supplemental breadcrumbs representing preferred locations within the hierarchical data set. The supplemental breadcrumb may represent a previously visited location within the hierarchical data set, and may be further limited to the previously visited locations that are subordinate to the currently selected location. The supplemental breadcrumb may also represent a frequently visited location within the hierarchical data set. For scoped hierarchical data sets, the preferred location may represent a previously visited location within the scope of the selected location, or a frequently visited location within the scope of the selected location. Several embodiments of user interface components featuring such supplemented breadcrumb lists and having various advantages are presented, as well as a few contexts for applying such supplemental breadcrumbs in a breadcrumb list.

19 Claims, 11 Drawing Sheets

| Nav. Order | Selected Node | Breadcrumb List |
|---|---|---|
| 1 | A | Node A |
| 2 | 104 — C | Node A ∥ Node C |
| 3 | 106 — E | Node A ∥ Node C ∥ Node E |
| 4 | 108 — C | Node A ∥ Node C ∥ (Node E (1)) |
| 5 | F | Node A ∥ Node F ∥ (Node C (2)) (Node E (1)) |
| 6 | H | Node A ∥ Node F ∥ Node H ∥ (Node C (2)) (Node E (1)) |
| 7 | I | Node A ∥ Node F ∥ Node H ∥ Node I ∥ (Node C (2)) (Node E (1)) |
| 8 | H | Node A ∥ Node F ∥ Node H ∥ (Node C (2)) (Node E (1)) (Node I (1)) |
| 9 | F | Node A ∥ Node F ∥ (Node C (2)) (Node H (1)) (Node E (1)) (Node I (1)) |
| 10 | C | Node A ∥ Node C ∥ (Node H (2)) (Node F (2)) (Node E (1)) (Node I (1)) |
| 11 | E | Node A ∥ Node C ∥ Node E ∥ (Node H (2)) (Node F (2)) (Node I (1)) |

70

U.S. PATENT DOCUMENTS

| | | | |
|---|---|---|---|
| 7,210,094 | B2 | 4/2007 | Dovin et al. |
| 7,287,234 | B2 | 10/2007 | Leah et al. |
| 2002/0075331 | A1 | 6/2002 | Orbanes et al. |
| 2002/0107973 | A1 | 8/2002 | Lennon et al. |
| 2002/0152267 | A1* | 10/2002 | Lennon .................. 709/203 |
| 2002/0154177 | A1 | 10/2002 | Barksdale et al. |
| 2003/0050916 | A1* | 3/2003 | Ortega et al. ................ 707/1 |
| 2003/0172078 | A1 | 9/2003 | Stumpf |
| 2003/0197738 | A1 | 10/2003 | Beit-Zuri et al. |
| 2003/0231216 | A1* | 12/2003 | McBrearty et al. ........... 345/855 |
| 2004/0068521 | A1 | 4/2004 | Haacke et al. |
| 2004/0177319 | A1 | 9/2004 | Horn |
| 2004/0193672 | A1 | 9/2004 | Samji et al. |
| 2004/0205638 | A1 | 10/2004 | Thomas et al. |
| 2004/0205659 | A1 | 10/2004 | Barry et al. |
| 2004/0207666 | A1 | 10/2004 | Hally et al. |
| 2004/0239683 | A1 | 12/2004 | Chu et al. |
| 2005/0080793 | A1 | 4/2005 | Lauff |
| 2005/0131945 | A1 | 6/2005 | Muller et al. |
| 2005/0154988 | A1 | 7/2005 | Proehl et al. |
| 2005/0234979 | A1 | 10/2005 | Martineau et al. |
| 2005/0278351 | A1 | 12/2005 | Niyogi et al. |
| 2006/0036568 | A1 | 2/2006 | Moore et al. |
| 2006/0085391 | A1 | 4/2006 | Turski et al. |
| 2006/0085790 | A1 | 4/2006 | Hintermeister et al. |
| 2006/0123361 | A1 | 6/2006 | Sorin et al. |
| 2006/0167760 | A1 | 7/2006 | Chakraborty et al. |
| 2006/0184892 | A1 | 8/2006 | Morris |
| 2006/0190432 | A1 | 8/2006 | Wang et al. |
| 2006/0212329 | A1 | 9/2006 | Lucas et al. |
| 2007/0028270 | A1 | 2/2007 | Ostojic et al. |
| 2007/0150461 | A1 | 6/2007 | Weigel et al. |
| 2007/0156651 | A1 | 7/2007 | Weigel et al. |
| 2007/0180051 | A1 | 8/2007 | Kelly et al. |
| 2008/0250339 | A1 | 10/2008 | Riggs et al. |
| 2008/0256468 | A1 | 10/2008 | Peters et al. |
| 2008/0282199 | A1 | 11/2008 | Gherardi |
| 2009/0044150 | A1* | 2/2009 | Liu et al. .................. 715/854 |
| 2009/0055762 | A1* | 2/2009 | Stiso ........................... 715/764 |
| 2009/0063547 | A1 | 3/2009 | Wright et al. |
| 2010/0179876 | A1* | 7/2010 | Holte ........................ 705/14.54 |

FOREIGN PATENT DOCUMENTS

| | | | |
|---|---|---|---|
| KR | 20050079966 A1 | 8/2005 | |

OTHER PUBLICATIONS

Crystal, et al., "Who's My Daddy? An Approach to Decentralized Information Architecture".

Lida, et al., "Breadcrumb Navigation: An Exploratory Study of Usage", http://psychology.wichita.edu/surl/usabilitynews/51/breadcrumb.htm, 2003.

Ryan Christopher D., "The Human-Computer Interface: Challenges for Educational Multimedia and Web Designers", Date: 2001, vol. 33, Issue: 4, pp. 51-54, ACM Press, New York, USA.

Non-Final Office Action cited in related U.S. Appl. No. 11/897,804 dated Jun. 23, 2010.

International Search Report cited in related PCT Application No. PCT/US2008/073894 dated Feb. 27, 2009.

Ahmed et al., "Navigation in Information Space: How Does Spatial Ability Play a Part?", IADIS International Conference on Web Based Communities, 2005, pp. 119-125.

Blustein et al., "An Evaluation of Lookahead Bredcrumbs for the WWW", ACM Press, New York, USA, 2005, pp. 202-204.

Maldonado et al., "Do Common User Interface Design Patterns Improve Navigation?", Proceedings of the Human Factors and Ergonomics Society 46th Annual Meeting, 2002, pp. 1315-1319.

Abe Crystal and Jesse Wilbur, "Who's My Daddy? An Approach to Decentralized Information Architecture", CHI '04, Extended Abstracts on Human Factors in Computing Systems, 2004, 1 pg.

European Search Report in related application No. 08798402.7 dated Jan. 7, 2011.

Final Office Action in related U.S. Appl. No. 11/897,804 dated Dec. 8, 2010.

European Search Report in related application No. 08798396.1 dated Jan. 7, 2011.

* cited by examiner

| Nav. Order | Selected Node | Breadcrumb List |
|---|---|---|
| 1 | 72 — A | (Node A) |
| 2 | 74 — C | (Node A) (Node C) |
| 3 | 76 — E | (Node A) (Node C) (Node E) — 80 |
| 4 | 78 — C | (Node A) (Node C) (Node E) — 82  — 84 |
| 5 | F | (Node A) (Node F) (Node C) (Node E) |
| 6 | H | (Node A) (Node F) (Node H) (Node C) (Node E) |
| 7 | I | (Node A) (Node F) (Node H) (Node I) (Node C) (Node E) |
| 8 | H | (Node A) (Node F) (Node H) (Node I) (Node C) (Node E) |
| 9 | F | (Node A) (Node F) (Node H) (Node I) (Node C) (Node E) |
| 10 | 86 — C | (Node A) (Node C) (Node F) (Node H) (Node I) (Node E) |
| 11 | E | (Node A) (Node C) (Node E) (Node F) (Node H) (Node I) |

| Nav. Order | Selected Node | Breadcrumb List |
|---|---|---|
| 1 | A | (Node A) |
| 2 | C | (Node A) (Node C) |
| 3 | E | (Node A) (Node C) (Node E) |
| 4 | 90 — C | (Node A) (Node C) (Node E) — 92 |
| 5 | 94 — F | (Node A) (Node F) |
| 6 | H | (Node A) (Node F) (Node H) |
| 7 | I | (Node A) (Node F) (Node H) (Node I) |
| 8 | H | (Node A) (Node F) (Node H) (Node I) |
| 9 | F | (Node A) (Node F) (Node H) (Node I) |
| 10 | C | (Node A) (Node C) (Node E) |
| 11 | E | (Node A) (Node C) (Node E) |

FIG. 3B

| Nav. Order | Selected Node | Breadcrumb List |
|---|---|---|
| 1 | A | Node A |
| 2 | 104 — C | Node A : Node C |
| 3 | 106 — E | Node A : Node C : Node E 110 |
| 4 | 108 — C | Node A : Node C (Node E (1)) 112 110 |
| 5 | F | Node A : Node F (Node C (2)) (Node E (1)) 112 110 |
| 6 | H | Node A : Node F : Node H (Node C (2)) (Node E (1)) |
| 7 | I | Node A : Node F : Node H : Node I (Node C (2)) (Node E (1)) |
| 8 | H | Node A : Node F : Node H (Node C (2)) (Node E (1)) (Node I (1)) |
| 9 | F | Node A : Node F (Node C (2)) (Node H (2)) (Node E (1)) (Node I (1)) |
| 10 | C | Node A : Node C (Node H (2)) (Node F (2)) (Node E (1)) (Node I (1)) |
| 11 | E | Node A : Node C : Node E (Node H (2)) (Node F (2)) (Node I (1)) |

| | Nav. Order | Selected Node | Breadcrumb List | |
|---|---|---|---|---|
| 152 | 1 | A | Node A | 154 |
| 152 | 2 | C | Node A : Node C | 154 |
| 152 | 3 | E | Node A : Node C / Node E — 166 | 154 |
| 152 | 4 | 164 — C | Node A : Node C / Node E | 154 |
| 152 | 5 | 168 — F | Node A : Node F | 154 |
| 152 | 6 | H | Node A : Node F / Node H — 172 | 154 |
| 152 | 7 | I | Node A : Node F / Node H / Node I — 174 | 151 |
| 152 | 8 | H | Node A : Node F / Node H / Node I — 176 | 154 |
| 152 | 9 | F | Node A : Node F / Node H / Node I | 154 |
| 152 | 10 | C | Node A : Node C / Node E | 154 |
| 152 | 11 | E | Node A : Node C / Node E | 154 |

| | Nav. Order | Selected Node | Breadcrumb List | |
|---|---|---|---|---|
| 152 | 1 | A | Node A — 178 | 154 |
| 152 | 2 | C | Node A : Node C / Node E | 154 |
| 152 | 3 | E | Node A : Node C / Node E — 178 | 154 |
| 152 | 4 | C | Node A : Node C / Node E — 180 | 154 |
| 152 | 5 | F | Node A : Node F / Node J — 180 | 154 |
| 152 | 6 | H | Node A : Node F / Node H / Node J | 154 |
| 152 | 7 | I | Node A : Node F / Node H / Node I — 180 | 151 |
| 152 | 8 | H | Node A : Node F / Node H / Node J | 154 |
| 152 | 9 | F | Node A : Node F / Node J — 180 / 178 | 154 |
| 152 | 10 | C | Node A : Node C / Node E | 154 |
| 152 | 11 | E | Node A : Node C / Node E | 154 |

FIG. 4D

BREADCRUMB LIST SUPPLEMENTING FOR HIERARCHICAL DATA SETS

BACKGROUND

Many areas of computing involve hierarchically organized data sets, as well as techniques for display and navigation through such data sets. A hierarchically organized set of such data items, also known as nodes, may be organized with one or more items at the topmost level, known as root nodes. Each node may contain any number of subordinate items, known as child nodes, which may in turn contain any number of subordinate items, etc. A node may also contain no child nodes, therefore serving as a leaf node. This organizational structure provides for a hierarchy of containment, where each node except for the root node(s) is contained within one higher-level node (known as a parent node.)

Hierarchical data organization may be used in several contexts. As one example, data stored in a format complying with an Extensible Markup Language (XML) schema is organized hierarchically, such that the XML data set contains at most one root node, and each data item except for the root node is contained within exactly one higher-level XML data item. In this example, containment represents nesting, which leads to a fully nested, strictly hierarchical data set.

Hierarchical data sets are often displayed through a treeview graphical user control, in which the individual nodes may be opened or closed to show or hide (respectively) the child nodes contained therein. An exemplary treeview is illustrated in FIGS. 1A-1B, each presenting a treeview of the same hierarchical data set in two different view states. FIG. 1A depicts a hierarchical data set 10 containing a root node 12, labeled Node A, that solely comprises the topmost level of the hierarchy, and that directly or indirectly contains all of the other nodes. For instance, Node A 12 directly contains Node B 14, Node C 16, Node F 22, and Node K 32, which together comprise the second level of the hierarchy. Node C 16 further contains Node D 18 and Node E 20, while Node F 22 further contains Node G 24, Node H 26, and Node J 30, and where Node H 26 further contains Node I 28.

Treeview user controls may be used to display very large hierarchical data sets comprising millions of nodes, but displaying all of the nodes would be cumbersome for user navigation. The treeview therefore allows each node to be displayed in an open or closed state, where a node in an open state (denoted by a "−" sign) is shown with all of the child nodes, while a node in a closed state (denoted by a "+" sign) is shown with its child nodes hidden. The open or closed state of a node in the treeview may be toggled by the user (e.g., by clicking on the "+" or "−" symbol to the left of the node with a pointing device, such as a mouse.) The treeview 10 depicted in FIG. 1B illustrates the same data set as the treeview of FIG. 1A, but with Node C 16, Node H 26, Node J 30, and Node K 32 shown in a closed state (thereby hiding Nodes D and E contained within Node C 16, and Node I contained within Node H 26.) The hierarchical data set 10 illustrated by the treeview of FIG. 1B still contains Nodes D, E, and I, but these child nodes are hidden in the current state of the treeview 10, and may be shown again by opening the respective parent nodes.

The hierarchical organization of the data set enables the description of nodes according to the respective paths to be traversed to reach them. For instance, in FIG. 1A, Node H 26 may be described as the child node of Node F 22, which is in turn the child node of Node A 12. In reverse order, Node H 26 may be reached by traversing the hierarchical data set 10 illustrated in FIG. 1A by beginning at Node A 12, navigating (among the child nodes of Node A 12) to Node F 22, and navigating (among the child nodes of Node F 22) to Node H 26. This sequence forms a hierarchical path of Node A: Node F: Node H, which may be used to describe the organization of Node H 26 within the hierarchical data set 10.

When a user is navigating through a hierarchical data set, this sequence may also be presented as a breadcrumb list, e.g., as the hierarchical series of nodes through which the user has navigated to reach the current node. FIG. 1C illustrates the breadcrumb list for each node in the hierarchical data set of FIG. 1A. In the exemplary breadcrumb list 40 of FIG. 1C, when each node 42 of the hierarchical data set is selected, it is associated with a breadcrumb list 44 containing breadcrumbs 46 representing each location within the path from a root node of the hierarchical data set to the selected node. In the exemplary breadcrumb lists 44 of FIG. 1C, the breadcrumbs 46 are displayed in order from the root node to the selected node. The displayed breadcrumb lists 44 therefore display for the user the path taken through the hierarchical data set to reach the selected node. Moreover, in some implementations, the breadcrumbs 46 of the breadcrumb lists 44 may be activated (e.g., by clicking on a breadcrumb with a pointing device, such as a mouse) to travel to the node represented by the activated breadcrumb (e.g., by causing a treeview displaying the same hierarchical data set to jump to the node represented by the activated breadcrumb.)

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

This disclosure discusses the representation of hierarchical data sets. The types of breadcrumb lists described hereinabove may provide some helpful information regarding the position of a node in the hierarchical data set, and may facilitate navigation up through these hierarchies. However, navigating within larger hierarchical data sets (those having many nodes) may necessitate many navigational steps, such as drilling down through many levels of the hierarchical data set to reach a desired node, and this may be cumbersome to the user. Additional navigational assistance may be provided in the context of a breadcrumb list for navigating to other desired portions of the hierarchical data set. The breadcrumb list may be supplemented to include one or more supplemental breadcrumbs that point to preferred locations within the hierarchy, either within or outside the path from a root node to the selected node. Some examples of preferred locations include: a previously visited location in the hierarchical data set; a location in the hierarchical data set that the user has frequently visited; and a location in the hierarchical data set that users often prefer to visit while navigating through the selected node. By including these preferred locations as "supplemental" breadcrumbs in the breadcrumb list (e.g., at the end of the list), the user interface may facilitate user navigation through the hierarchical data set.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 3A is a table illustrating an exemplary set of breadcrumb paths representing an exemplary navigation history through the exemplary hierarchical data set illustrated in FIG. 1A.

FIG. 3B is a table illustrating another exemplary set of breadcrumb paths representing an exemplary navigation history through the exemplary hierarchical data set illustrated in FIG. 1A.

FIG. 3E is a table illustrating another exemplary set of breadcrumb paths for various nodes in the exemplary hierarchical data set illustrated in FIG. 1A.

FIG. 4C is a table illustrating another exemplary set of breadcrumb paths representing an exemplary navigation history through the exemplary scoped hierarchical data set illustrated in FIG. 4A.

FIG. 4D is a table illustrating an exemplary set of breadcrumb paths for various nodes in the exemplary scoped hierarchical data set illustrated in FIG. 4A.

DETAILED DESCRIPTION

Figures 1A, 1B, 1C:
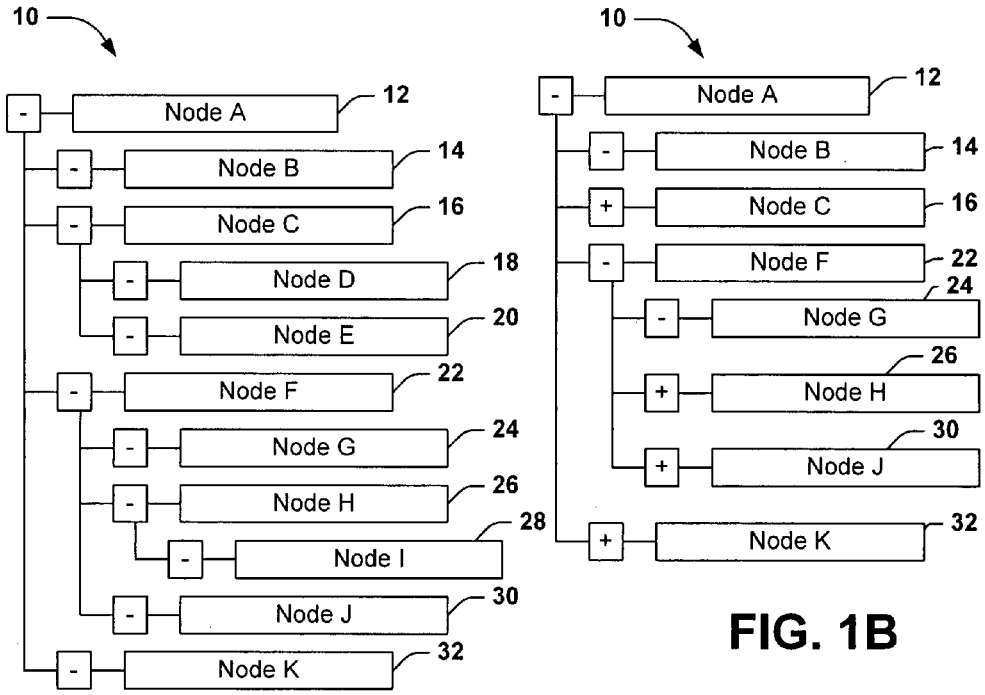
FIG. 1A-1B are illustrations of exemplary treeview user interface components for an exemplary hierarchical data set.
FIG. 1C is a table of breadcrumb lists for various nodes in the exemplary hierarchical data set illustrated in FIGS. 1A-1B.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

This disclosure relates to techniques for representing hierarchical data sets, and particularly to breadcrumb lists for navigating through hierarchical data sets. A treeview control may be associated with a very large hierarchical data set, but the amount of information contained therein may be cumbersome for a treeview control. In particular, navigating through large hierarchical data sets may be very time-consuming, since the user may have to manage the opening and closing of many nodes in the treeview in order to reach a low-level node. While a breadcrumb list showing the list of parents up to a root node may be helpful for some navigational patterns, other navigational patterns may not be considerably facilitated by such a breadcrumb list. As one example, if the user needs to visit a few nodes repeatedly, especially where such nodes reside in different portions of the hierarchical data set and are reached from the root node by considerably different paths, then navigation may involve repeatedly navigating down through the same sequence of nodes to reach each such node. As another example, if the user needs to visit a particular node frequently, or if the user needs to visit a node that is many levels deep in the hierarchy but is frequently visited by users of the hierarchy, then the breadcrumb lists described hereinabove may not considerably expedite such navigation.

An alternative breadcrumb list user interface component may present various portions of the breadcrumb list as related groups of information. In anticipation of the navigation patterns described hereinabove, the breadcrumb list for a selected node may be generated with breadcrumbs leading back to a root node, and may then be supplemented with at least one supplemental breadcrumb representing a preferred location within the hierarchical data set. As one example, the supplemental breadcrumb may represent a location that the user has previously visited while navigating through the hierarchical data set (and in particular, a location subordinate to the selected node.) As another example, the supplemental breadcrumb may represent a location that the user has frequently visited while navigating within the hierarchical data set. As a third example, the supplemental breadcrumb may represent a location that other users of the hierarchical data set frequently visit (particularly while navigating through the selected node.) By adding at least one supplemental breadcrumb to the breadcrumb list (e.g., by appending it to the breadcrumb list), the graphical user interface for the hierarchical data set may facilitate user navigation through the hierarchical data set by providing shortcuts to preferred locations.

Figure 2:
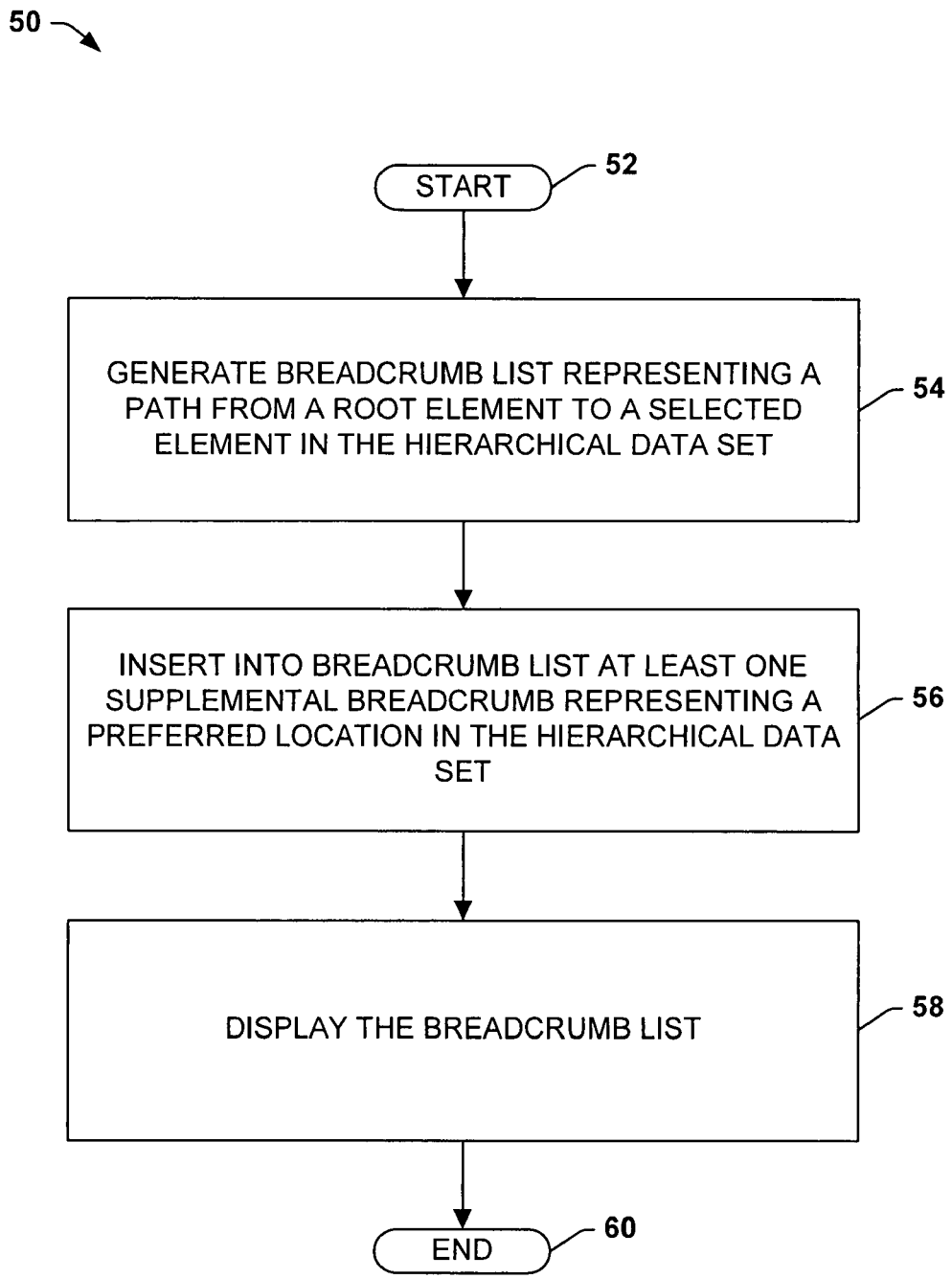
FIG. 2 is a flowchart illustration depicting an exemplary method.

FIG. 2 presents a flowchart illustrating an exemplary method relating to the use of supplemental breadcrumbs for breadcrumb lists related to hierarchical data sets. This figure illustrates a method 50 of facilitating navigation in a hierarchical data set. The method 50 begins at 52 and involves generating a breadcrumb list representing a path from a root node to a selected node in the hierarchical data set 54. The method 50 also involves adding to the breadcrumb list at least one supplemental breadcrumb representing a preferred location in the hierarchical data set 56. The method 50 also involves displaying the breadcrumb list 58. By generating this type of breadcrumb list, adding one or more supplemental breadcrumbs, and displaying the breadcrumb list for the user, the method 50 facilitates user navigation through the hierarchical data set; and having achieved this result, the method ends at 60.

Figures 3C, 3D:
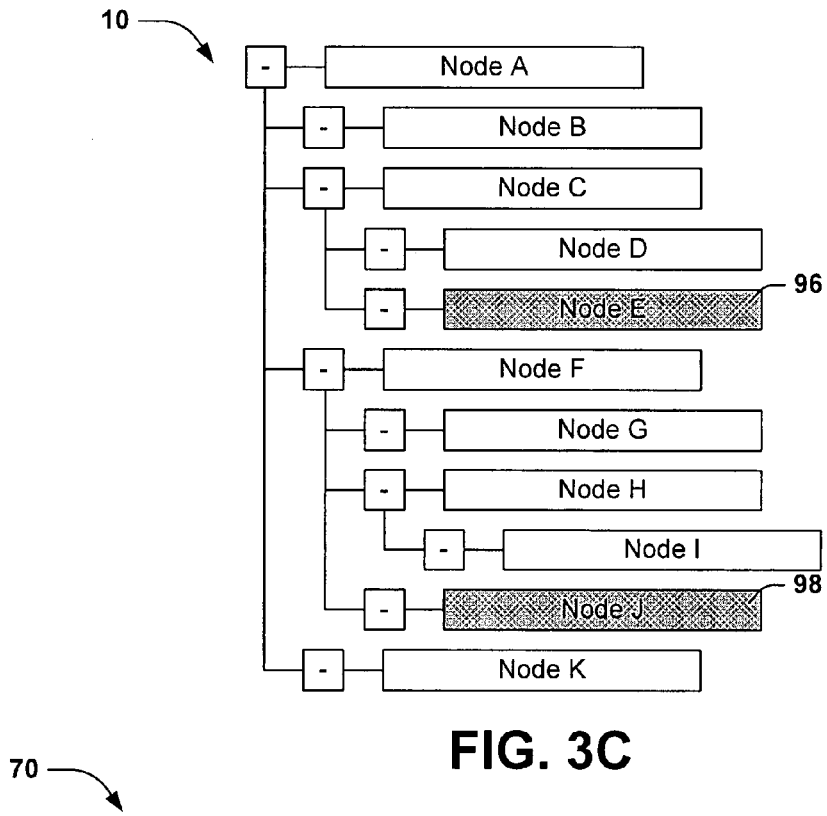
FIG. 3C is a table illustrating an exemplary set of breadcrumb paths for various nodes in the exemplary hierarchical data set illustrated in FIG. 1A.
FIG. 3D is a table illustrating another exemplary set of breadcrumb paths for various nodes in the exemplary hierarchical data set illustrated in FIG. 1A.

FIGS. 3A-3E illustrate some embodiments of breadcrumb lists having supplemental breadcrumbs representing various preferred locations. The hierarchical data set illustrated in FIG. 1A serves as the basis for FIGS. 3A, 3B, and 3E and the concepts illustrated therein. FIG. 3C illustrates a slightly modified version of the hierarchical data set of FIG. 1A, and this modified version serves as the basis for FIG. 3D and the concepts presented therein. Therefore, it may be helpful to reference FIGS. 1A and 3C for a full understanding of FIGS. 3A-3B and 3D-3E and the concepts illustrated therein. Also, in these exemplary breadcrumb lists, the supplemental breadcrumbs are shown in a different color (gray) as compared with the breadcrumbs comprising the path from the root node to the selected node (white), and the supplemental breadcrumbs are appended to the breadcrumbs comprising the path. However, many variations of the visual styling aspects of the supplemental breadcrumbs are possible, and several such variations are discussed in more detail following the discussion of FIGS. 3A-3E.

FIG. 3A presents a table of exemplary breadcrumb lists for various nodes of the exemplary hierarchical data set of FIG. 1A in light of an exemplary navigation history, where the user visits nodes of the hierarchical data set in a particular order (e.g., first Node A, then Node C, then Node E, then back to Node C, etc.) Although the exemplary navigation history illustrated of FIG. 3A features single-step navigation through the hierarchical data set, it will be appreciated that a user might visit the nodes of a hierarchical data set in any order. For each navigation in this exemplary navigation history 70, the user is presented with a list of breadcrumbs relating to the selected node. According to one or more techniques described herein, the breadcrumb list comprises breadcrumbs representing the path from a root node (in this case, Node A) to the selected node (e.g., 72, 74, 76), along with one or more supplemental breadcrumbs representing a preferred location. In the exemplary breadcrumb lists of FIG. 3A, the supplemental breadcrumbs represent previously visited nodes in the hierarchical data set. In the first three navigations, the user visits (e.g., selects) nodes (72, 74, and 76, respectively) that consecutively comprise the breadcrumb path. In the fourth navigation, the user navigates upward to parent Node C 78, such that previously visited child Node E is no longer included in the breadcrumb path from root Node A to selected Node C 78. In this embodiment of the techniques described herein, Node E is a preferred location within the hierarchy due to the user's previous visiting of the node, and is therefore represented as a supplemental breadcrumb 80 in the breadcrumb path. Similarly, the fifth navigation travels from the portion of the hierarchical data set containing Node C to a different portion containing Node F; accordingly, the breadcrumb list for this navigation comprises breadcrumbs representing the path from root Node A to selected Node F, as well as supplemental breadcrumbs representing previously visited locations, such as Node C 82 and Node E 84.

It will be appreciated that the breadcrumb lists of FIG. 3A include supplemental breadcrumbs representing preferred locations comprising previously visited nodes. This technique for generating supplemental breadcrumbs may be embodied in many implementations, each of which may have various advantages. As one example, and as illustrated in FIG. 3A, a previously visited location is not added as a supplemental breadcrumb if the location is included in the path from the root node to the selected node. For example, in the tenth navigation, previously visited Node C 86 is omitted from the supplemental breadcrumbs (despite its inclusion as a supplemental breadcrumb during the ninth navigation) because Node C is already present as a breadcrumb 88 comprising the path from root Node A to the selected Node C 86. As another example, the number of supplemental breadcrumbs may be capped, either absolutely (e.g., no more than three supplemental breadcrumbs) or in relation to the size of the breadcrumb list (e.g., no more than eight breadcrumbs in the breadcrumb list.) Other variations may be devised by those having ordinary skill in the art that may operate in accordance with the techniques described herein.

FIG. 3B illustrates another table of exemplary breadcrumb lists for various nodes of the exemplary hierarchical data set of FIG. 1A in light of the same exemplary navigation history as in FIG. 3A. This implementation differs from that shown in FIG. 3A by featuring an additional limitation on the selection of preferred locations for supplemental breadcrumbs. As in FIG. 3A, a preferred location is a node that has been formerly visited and is not already part of the breadcrumb path; and, additionally, the location is subordinate (e.g., further down within the treeview) to the selected node in the hierarchical data set. For example, in the third navigation, Node E is included as a supplemental breadcrumb 92 representing a preferred location because it is subordinate to current Node C 90. However, in the fifth navigation to Node F, neither previously visited Node C nor previously visited Node E is included as a supplemental breadcrumb, because neither Node C nor Node E is subordinate to Node F 94. This exemplary selection technique might be advantageous in limiting the set of supplemental breadcrumbs to those that are more relevant to the selected node, and by hiding those representing other (potentially unrelated) portions of the hierarchical data set.

In another variation that may be represented by FIG. 3B, the nodes of the hierarchical data set comprise a subordinate node visit memory. As the user navigates through the hierarchical data set, a node may record in the subordinate node visit memory the subordinate nodes (e.g., child nodes, grandchild nodes, etc.) that the user visits. The subordinate node visit memory may also include other details of the visit to the subordinate node (e.g., the recency of the visit, the frequency of the visit, the amount of time that the subordinate node was selected, etc.) When the user later selects a node, the subordinate node visit memory of the selected node may be accessed to determine the subordinate nodes of the selected node that the user has visited, and supplemental breadcrumbs may be generated and inserted into the breadcumb list for the previously visited subordinate nodes. Moreover, such supplemental breadcrumbs may be sorted in various manners, and may be based on the additional information recorded about the subordinate node visis. For example, the supplemental breadcrumbs generated from the subordinate node visit memory may be sorted according to the hierarchical levels of the child nodes (e.g., all child nodes first, then all grandchild nodes, etc.), recency or frequency of visitation, the amount of time that the subordinate nodes were selected, etc. Other variations may be devised by those having ordinary skill in the art that may operate in accordance with the techniques described herein. For example, in FIG. 3B, Node F 94 comprises a subordinate node visit memory that is initially empty. As the user visits Nodes H and I (which are subordinate to Node F 94), Node F 94 may record in its subordinate node visit memory the visitation of such subordinate nodes. Upon a later selection of Node F 94 (e.g., in the ninth visit), the subordinate node visit memory of Node F 94 may be utilized to generate supplemental breadcrumbs for such previously visited subordinate nodes.

FIG. 3C illustrates the hierarchical data set of FIG. 1A, but with the additional feature of having two nodes (Node E 96 and Node J 98) identified as frequently visited by users of the hierarchical data set 10. For example, in a hierarchical data set comprising a media collection, Node E 96 and Node J 98 may represent media items that users of the media collection have most frequently played (e.g., the current hits in the media set.) These identifiers are also considered preferred locations in the hierarchical data set. Accordingly, FIG. 3D illustrates another table 70 of exemplary breadcrumb lists for various nodes of the exemplary hierarchical data set, and wherein the preferred locations (e.g., the nodes that users of the hierarchical data set most frequently visit) are included as supplemental breadcrumbs. Hence, Nodes E and J are added as supplemental breadcrumbs (100 and 102, respectively) to the breadcrumb list for each navigation, except where one of the nodes is already included in the breadcrumb list (e.g., Node E is not included as a supplemental breadcrumb in the third navigation because Node E is already in the breadcrumb list.) The particulars of this implementation could also be combined with the particulars of the implementation illustrated in FIG. 3B, such that the frequently visited nodes are only included as supplemental breadcrumbs when the referenced location is subordinate to the selected node.

FIG. 3E illustrates yet another table of exemplary breadcrumb lists for various nodes of the exemplary hierarchical data set of FIG. 1A in light of the same exemplary navigation history as in FIG. 3A. This implementation differs by choosing preferred locations for the supplemental breadcrumbs based on the frequency with which the user has visited each of the nodes during the traversal of the hierarchical data set. In this embodiment, the system tracks the number of visitations to each node of the hierarchical data set, and displays supplemental breadcrumbs for the previously nodes that are not included in the breadcrumb list representing the path from a root node to the selected node. For example, subsequent to the first visitation of Node E 106, Node E is displayed as a supplemental breadcrumb 110 representing a location that has been visited once. Similarly, subsequent to the first two visitations of Node C 104, 108, Node C is displayed as a supplemental breadcrumb 112 representing a location that has been visited twice. Moreover, the supplemental breadcrumbs may be sorted according to the frequency of visitation. The frequency of visitation may be displayed within each supplemental breadcrumb (e.g., the fifth navigation includes a supplemental breadcrumb referencing Node C, and indicating that this node has been visited by the user twice), or may simply be used to select and/or sort the set of supplemental breadcrumbs. Note also that previously visited nodes are not displayed as supplemental breadcrumbs where the nodes are part of the breadcrumb list. For example, Node F is not included as a supplemental breadcrumb in the sixth navigation because Node F is included in the breadcrumb list representing the path from the root node (Node A) to the selected node (Node H).

An additional set of embodiments relating to the preferred locations represented by the supplemental breadcrumbs involve the concept of a scoped hierarchical data set. In particular, navigating through hierarchical data sets having many levels may be very time-consuming, since the user may have to manage the opening and closing of many nodes in the treeview in order to reach a low-level node. Similarly, the breadcrumb list for a low-level control may grow onerously long (e.g., within the corpus of U.S. federal law as a hierarchical data set, referencing a particular patent rule might be represented with a breadcrumb list such as "United States Code: Chapter 35: Section 103: Paragraph (b): Subparagraph (3): Subsubparagraph (A): Subsubsubparagraph (iii)", for a total of seven breadcrumbs.) The display of multiple levels of depth in a conventional breadcrumb list may overwhelm the user with too much information, thereby diminishing the navigational utility of each user interface component. This drawback may be exacerbated on devices with small displays, such as smart cellular phones and ultramobile PCs (UMPCs), which feature scaled-down LCD screens for enhanced portability.

An alternative breadcrumb list user interface component may present various portions of the breadcrumb list as related groups of information. Various levels of the hierarchy that are conceptually linked may be aggregately presented as one breadcrumb, and the aggregation may be increased as the user navigates deeper into the hierarchy. For example, the portion of the U.S. patent law referenced above may be more conveniently described as a breadcrumb list comprising "United States Code, Chapter 35: Section 103, Paragraph (b), Subparagraph (3): Subsubparagraph (A), Subsubsubparagraph (iii)", for a total of three breadcrumbs, which is condensed as compared with the seven breadcrumbs of the unscoped breadcrumb list for this same rule. These particular scoped breadcrumbs are more often cited as a first breadcrumb representing "35 U.S.C.", a second breadcrumb representing "Section 103(b)(3)", and a third breadcrumb representing "A iii". This condensed breadcrumb list relies on the aggregation of similar types of information to display a smaller number of breadcrumbs.

Linking various levels of a hierarchical data set according to some sort of conceptual criteria is referred to as "scoping". In this manner, a few levels in a certain portion of a hierarchical data set may be denoted as sharing a scope, such that navigating within or below these levels in the hierarchy produces an aggregated breadcrumb in the breadcrumb list that references the nodes of the multiple levels within the scope, for example. In the context of breadcrumb lists, scoping allows multiple breadcrumbs/nodes to be aggregated into a single breadcrumb or one atomic unit to facilitate more efficient data navigation and/or management.

Figures 4A, 4B:
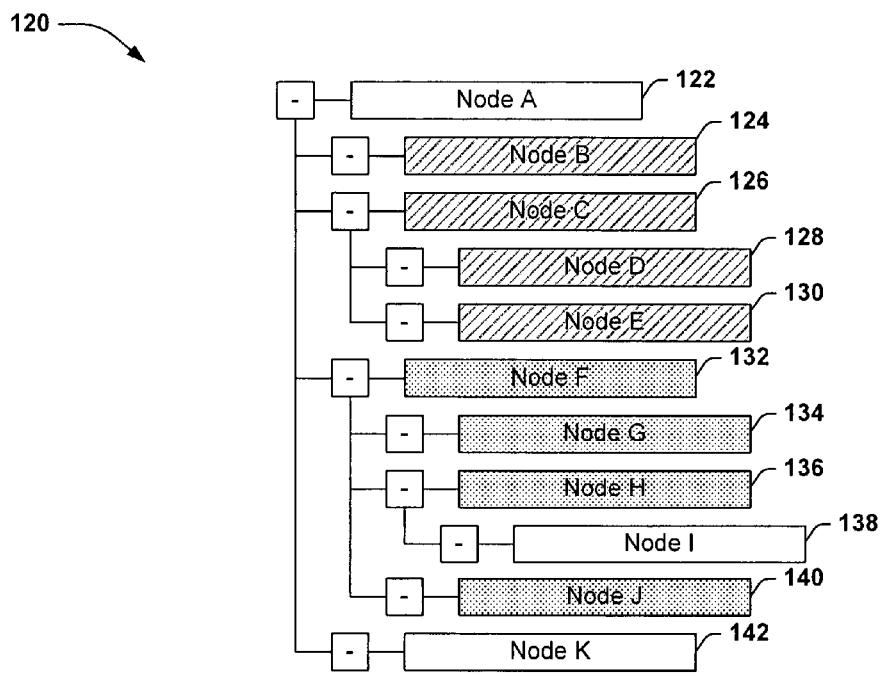
FIG. 4A is an illustration of an exemplary treeview user interface component for an exemplary scoped hierarchical data set.
FIG. 4B is a table of breadcrumb lists for various nodes in the exemplary scoped hierarchical data set illustrated in FIG. 4A.

The concept of a scoped hierarchical data set is illustrated in FIG. 4A, which depicts an exemplary scoped hierarchical data set 120 containing the same organization of nodes as the non-scoped hierarchical data set 10 of FIG. 1A, but where some nodes of the former hierarchy have been grouped into scopes. Two scopes are illustrated therein: one scope comprising the second-level nodes B 124 and C 126 and the third-level nodes D 128 and E 130 within node C 126; and one scope comprising the second-level node F 132 and the third-level nodes G 134, H 136, and J 140. The scopes are depicted with hashing and shading for illustrative purposes, but it will be appreciated that the hierarchical scopes are a conceptual relationship; while the user interfaces depicting scoped hierarchies might incorporate one or more distinctive visual styles, the visual presentation is not a requisite element of this technique. It will be noted from FIG. 4A that the child nodes of a particular node are not necessarily of the same scope. For instance, Node A 122 contains as child nodes both Nodes B 124 and C 126 (of one scope), Node F 132 (of another scope), and Node K 142 (unscoped.) It will also be noted that a node associated with a scope may contain child nodes associated with another scope, or with no scope. For instance, Node H 136, of the same scope as Nodes F 132, G 134, and J 140, contains Node I 138, which is unscoped. Finally, it will be noted that it is advantageous for each scope to comprise at least one pair of nodes having a parent-node/child-node hierarchical relationship (e.g., Node E 130 to Node C 126), in order to permit the aggregation of such nodes in a scoped breadcrumb.

FIG. 4B illustrates breadcrumb lists having scoped breadcrumbs for various nodes of the scoped hierarchical data set 120 illustrated in FIG. 4A. In the exemplary breadcrumb list 150 of FIG. 4B, when each node of the hierarchical data set is selected, it is associated with a breadcrumb list 154 containing breadcrumbs representing each location within the path from a root node of the hierarchical data set to the selected node 152. Moreover, the breadcrumb lists 154 presented in this table 150 advantageously incorporate the hierarchical scoping of nodes in the hierarchical data set 120. Because Nodes C, D, and E share a hierarchical scope, the breadcrumbs that reference these nodes are aggregated to produce a scoped breadcrumb 156. Thus, the breadcrumb list for Node D features a scoped breadcrumb 156 that comprises both Nodes C and D, and the breadcrumb list for Node E features a scoped breadcrumb that comprises both Nodes C and E 158. As noted in the discussion of FIG. 4A, a node having a scope may contain a child node of a different scope or no scope. For example, in the exemplary hierarchical data set 120 of FIG. 4A, Node I 138 is an unscoped child node of Node H 136, which shares a scope with Node F 132; therefore, in the breadcrumb lists 150 associated with this hierarchical data set, Nodes F and H are aggregated into one scoped breadcrumb 160, while Node I is presented as an unscoped breadcrumb 162 in the breadcrumb list. A comparison of the scoped breadcrumb lists 150 depicted in FIG. 4B with the unscoped breadcrumb lists 40 depicted in FIG. 1C illustrates the comparative shortening of scoped breadcrumb lists vs. unscoped breadcrumb lists.

In the context of scoped hierarchical data sets, the inclusion of a supplemental breadcrumb may further facilitate user navigation through the hierarchical data set, in light of the scopes of the nodes represented by the breadcrumbs. FIG. 4C illustrates another table 150 of exemplary breadcrumb lists for various nodes of the exemplary scoped hierarchical data set of FIG. 4A, in light of the same exemplary navigation history as the navigation history of FIG. 3B through the exemplary unscoped hierarchical data set of FIG. 1A. The implementation depicted in FIG. 4C displays breadcrumb lists comprising supplemental breadcrumbs for preferred locations comprising nodes that have been formerly visited, that are not part of the breadcrumb path from a root node to the selected node, and that share a hierarchical scope with the selected node. For example, in the fourth navigation, Node E is included as a supplemental breadcrumb 166 representing a preferred location because it is subordinate to selected Node C 164. However, in the fifth navigation to Node F, neither previously visited Node C nor previously visited Node E is included as a supplemental breadcrumb, because neither Node C nor Node E is subordinate to selected Node F 168. Moreover, similar types of breadcrumbs sharing a hierarchical scope are aggregated into one scoped breadcrumb. For example, in the eighth navigation, Nodes F and H (each node within the path from root Node A to the selected Node H) share a hierarchical scope, and are therefore aggregated into one scoped breadcrumb 172. Since the Node I breadcrumb 174 is a supplemental breadcrumb, however, it is not aggregated with the breadcrumb representing Nodes F and H 172. Since the Node I breadcrumb 174 is a supplemental breadcrumb, however, it is not aggregated with the breadcrumb representing Nodes F and H 172. One such embodiment may be configured to aggregate supplemental breadcrumbs with other supplemental breadcrumbs of the same hierarchical scope, but not with the breadcrumbs that comprise the path from a root node to the selected node (whether or not sharing a hierarchical scope.) For example, although Nodes H and I are not illustrated as sharing a scope in FIG. 4A, for purposes of illustration in the ninth navigation, Nodes H and I, which are supplemental breadcrumbs in this navigation, are aggregated into a scoped breadcrumb 176 as if sharing a hierarchical scope.

FIG. 4D illustrates another table 150 of exemplary breadcrumb lists 154 for various nodes 152 of the exemplary scoped hierarchical data set of FIG. 4A, and wherein the preferred locations (e.g., the nodes that users of the hierarchical data set most frequently visit) are included as supplemental breadcrumbs, but only when the preferred location shares the hierarchical scope of the selected node 152. As in FIG. 3C, Nodes E and J are regarded as frequently visited locations in the exemplary hierarchical data set 120 of FIG. 4A. Moreover, Node E also shares the same hierarchical scope as Nodes B, C, and D; and Node J shares the same hierarchical scope as Nodes F, G, and H. Hence, during the navigation history of FIG. 4D, Node E is added to the breadcrumb list as a supplemental breadcrumb 178 when the selected node 152 is Node B, C, or D (such as in the second, fourth, and tenth navigations.) Similarly, Node J is added to the breadcrumb list as a supplemental breadcrumb 180 when the selected node 152 is Node F, G, or H (such as in the fifth, sixth, eight, and ninth navigations.) In this manner, the breadcrumb list 154 may facilitate user navigation to portions of the hierarchical scope that are of preferred interest among users of the hierarchical data set.

Figure 5A:
FIG. 5A is an illustration of a breadcrumb list having a visual aspect as described herein.
Figure 5B:
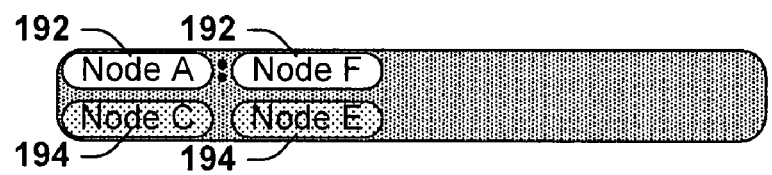
FIG. 5B is an illustration of another breadcrumb list having a visual aspect as described herein.
Figure 5C:
FIG. 5C is an illustration of yet another breadcrumb list having a visual aspect as described herein.
Figure 5D:
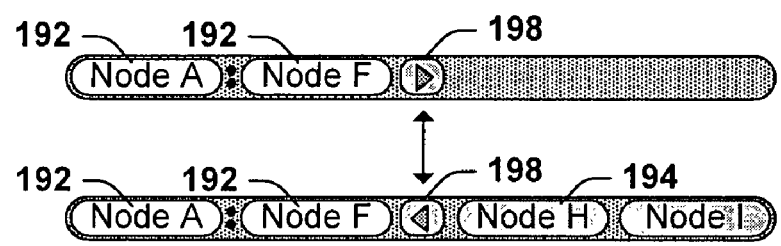
FIG. 5D is an illustration of yet another breadcrumb list having a visual aspect as described herein.

As noted herein, the breadcrumb list is displayed for the user. The displaying of the breadcrumb list may be performed in many ways, and may vary in many aspects that may present some advantages. FIGS. 5A-5D illustrate a few such variable aspects of the displaying of the breadcrumb lists. As one example, such as illustrated in FIG. 5A, the breadcrumb list 190 is presented with a supplemental breadcrumb 194 displayed with a distinctive visual style, especially as compared with the breadcrumbs 192 representing the path from a root node to the selected node. In FIG. 5A, the supplemental breadcrumb 194 is displayed with a shading style that distinguishes it from the other breadcrumbs 192 in the breadcrumb list 190. The distinctive visual style for the supplemental breadcrumb might comprise a different size, shape, font, font style, color, etc, or any combination thereof. Another aspect of the displaying that may be varied relates to the addition of the supplemental breadcrumbs to the breadcrumb list. In the previous examples (FIGS. 3A-3B, FIGS. 3D-3E, and FIGS. 4B-4D), the supplemental breadcrumbs are appended to the breadcrumb list. However, the supplemental breadcrumbs might also be added in other ways, such as prepending to the breadcrumb list, interleaving with the other breadcrumbs of the breadcrumb list, etc. The exemplary breadcrumb list 190 illustrated in FIG. 5B depicts the supplemental breadcrumbs 194 as having been added to the breadcrumb list by displaying the supplemental breadcrumbs 194 below the other breadcrumbs 192. FIG. 5C illustrates a third aspect of the displaying of the supplemental breadcrumbs, wherein the supplemental breadcrumb for a preferred location (e.g., a frequently visited location) is displayed in a condensed supplemental breadcrumb indicator 196 that may be used to activate the supplemental breadcrumb, but that omits the details of the supplemental breadcrumb. For example, the condensed supplemental breadcrumb indicator may represent a frequently visited location (e.g., the node subordinate to the selected node that users of the hierarchical data set often wish to visit), and the condensed supplemental breadcrumb indicator may be used to indicate the identification and availability of the represented node, while reducing used space in the breadcrumb list. FIG. 5D illustrates a fourth aspect of the displaying of the supplemental breadcrumbs involving the displaying of a supplemental breadcrumb indicator 198 in the breadcrumb list 190 that is configured to toggle displaying the at least one supplemental breadcrumb 194. Thus, the breadcrumb list 190 may comprise the breadcrumbs 192 representing the path from a root node to the selected node, and may also include one or more supplemental breadcrumbs 194 representing preferred locations, but the supplemental breadcrumbs 194 may be initially hidden upon displaying the breadcrumb list 190, with the supplemental breadcrumb indicator 196 included to denote the inclusion of supplemental breadcrumbs 194. User activation of the supplemental breadcrumb indicator 198 (e.g., clicking on the supplemental breadcrumb indicator with a pointing device, such as a mouse) may toggle between showing and hiding the supplemental breadcrumbs 194. Many such aspects of the displaying of the breadcrumb lists may be devised and varied by those of ordinary skill in the art that may operate in accordance with the techniques presented herein.

The technique of including one or more supplemental breadcrumbs in a breadcrumb list may also be implemented as a system, such as a system for facilitating navigation in a hierarchical data set. A system of this nature might comprise a memory configured to represent the hierarchical data set; a breadcrumbing component configured to generate a breadcrumb list representing a path from a root node to a selected node in the hierarchical data set, and configured to add to the breadcrumb list at least one supplemental breadcrumb representing a preferred location in the hierarchical data set; and a display component configured to display the breadcrumb list. The breadcrumb lists generated by such a system may facilitate user navigation through the hierarchical data set by providing navigational access not only to the parent nodes of the selected node, but also to other preferred locations within the hierarchical data set (e.g., previously visited locations and/or frequently visited locations.) The alternatives for choosing preferred locations for the supplemental breadcrumbs as described hereinabove may be implemented by a breadcrumbing component, for example.

Systems embodying these concepts may be assembled in many variations. As one example, the breadcrumb list may comprise hardware configured to generate breadcrumb lists in accordance with these techniques, such as a field-programmable gate array (FPGA). Alternatively or additionally, the breadcrumbing component may comprise software instructions encoded for execution on general-purpose hardware, e.g., a desktop processor, and configured to generate breadcrumb lists having one or more supplemental breadcrumbs representing preferred locations. Similarly, the display component may comprise a visual display apparatus, such as (e.g.) an LCD monitor, CRT monitor, projector, or printer. The display component may also comprise an interface for communicating between the breadcrumbing component and the visual display apparatus, such as a display adapter, a video memory buffer, a software driver, and/or a visual programming interface, for example. Also, the display component may be configured to incorporate any or several of the particular embodiments discussed hereinabove. As one example, the display component may be configured to display a supplemental breadcrumb indicator configured to toggle displaying the supplemental breadcrumbs. As another example, the display component may be configured to display the supplemental breadcrumbs with distinctive visual styles, such as a distinctive color and/or shading, for example, that differentiates different types of supplemental breadcrumbs from other types and from the breadcrumbs comprising the path to the root node. Many such systems may be devised by those of ordinary skill in the art that are configured to operate in accordance with the techniques presented herein.

Other embodiments of systems implemented in accordance with the concepts described herein may include additional components. In one such set of embodiments, the system may comprise an input component, such as a keyboard or a mouse, configured to accept user input in relation to the breadcrumb list. As one example, the input component may be configured to accept user input representing activation of a breadcrumb, and the display component configured to present a node within the activation breadcrumb in a user interface component (e.g., a viewer configured to display the node within the activated breadcrumb.) Many such input components may be devised by those of ordinary skill in the art in the context of systems configured to operate in accordance with the techniques presented herein.

Figure 6:
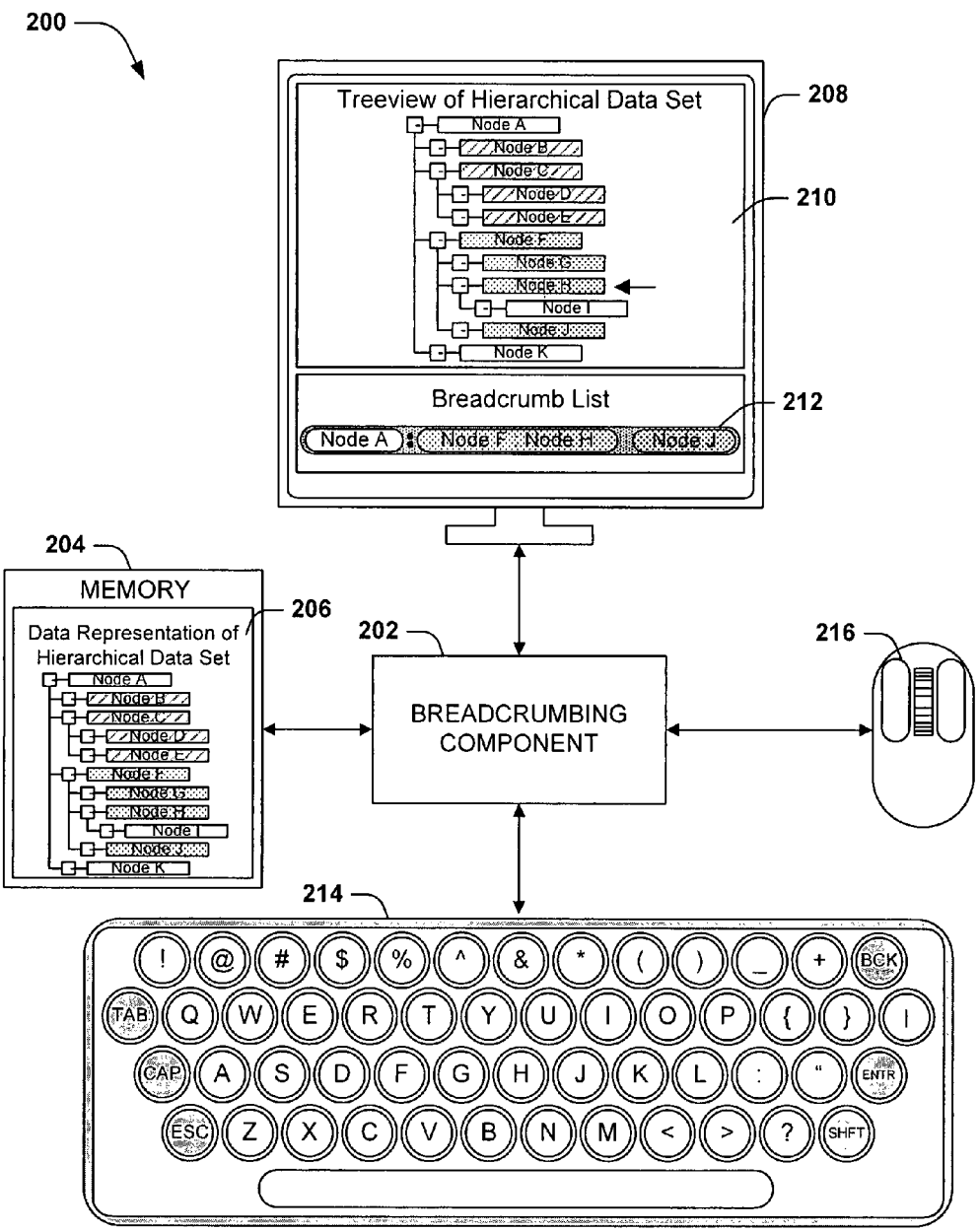
FIG. 6 is a component diagram illustrating an exemplary system.

FIG. 6. illustrates an exemplary system for generating breadcrumb lists featuring supplemental breadcrumbs, where the system 200 incorporates several of the aspects described herein. In this exemplary figure, the system 200 comprises a breadcrumbing component 202 operably coupled with a memory 204 containing a data representation 206 of the hierarchical data set. The system 200 also comprises a display component 208 configured to display the breadcrumb list 212 including supplemental breadcrumbs generated by the breadcrumbing component 202 for a selected node in the hierarchical data set 206 (displayed in FIG. 6 as a treeview of the hierarchical data set.) The system 200 also comprises two input devices, a keyboard 214 and a mouse 216, which may be configured to accept user input in relation to the breadcrumb list 212. Together, these components comprise a system 200 for generating and displaying a breadcrumb list 212 having one or more supplemental breadcrumbs for the hierarchical data set 206, and allow user interaction with the hierarchical data set 206 (e.g., facilitated navigation through the nodes of the hierarchical data set 206.) In this exemplary system 200, the memory 204 contains a data representation of a scoped hierarchical data set 206 having one hierarchical scope for Nodes B, C, D, and E, and another hierarchical scope for Nodes F, G, H, and J. The display component 208 in this exemplary system illustrates a treeview 210 wherein Node H is selected, and a breadcrumb list 212 representing the path from root Node A to selected Node H (as well as a scoped breadcrumb reflecting the hierarchical scope shared by Nodes F and H.) This breadcrumb list 212 also represents Node J as a supplemental breadcrumb, which shares the hierarchy of selected Node H. This supplemental breadcrumb may have been included because the location that it represents (Node J) has been previously visited, or because it represents a frequently visited node in this exemplary scoped hierarchical data set 206.

The technique of including supplemental breadcrumbs in the breadcrumb list may also be utilized in an integrated development environment. Graphical user interface (GUI) applications are often created within such an environment, which provides a sophisticated set of tools for designing rich user interfaces with various graphical controls, such as buttons, textboxes, and listboxes, and for writing software that interacts with the user through such controls comprising the graphical user interface. One common feature of such applications is the representation of the graphical user interface application (the "form") as a hierarchical data set, where the root node representing the form contains the various graphical controls, which may contain other controls (e.g., a panel that contains a set of buttons) and a wide number of configurable properties. However, in recent years, the assortment of user controls has developed in sophistication and complexity. Modern integrated development environments provide programmers with many simple tools for building graphical user interface applications, such as buttons and listboxes, and also a growing assortment of more complex components, such as media players, graphical charting components, complex database interaction components, and even prepackaged neural networks.

As the variety and complexity of components that may comprise a graphical user interface application have developed, the hierarchical data set of information describing the assortment and details of such controls to the programmer has also grown in size. The programmer may have difficulty navigating through the expansive hierarchical data set while designing the application. Even the use of a breadcrumb list may not facilitate navigation, as controls and properties may be located several levels deep in the hierarchical data set, thereby requiring a cumbersome breadcrumb list to describe the object (e.g., a breadcrumb list of "Application Form: Controls: Media Player: Media Control Panel: Progress Slider: Scrollbar"—six nested nodes deep, and hence six unscoped breadcrumbs—might describe the progressive scrollbar in a media player application.) Hierarchical scopes may be applied to the hierarchical data set of graphical user interface components, and a selected node may be described by generating and displaying a scoped breadcrumb list (e.g., "Application Form, Controls: Media Player, Media Control Panel: Progress Slider, Scrollbar" has only three scoped breadcrumbs.) Navigation may also be facilitated by the inclusion of supplemental breadcrumbs in the breadcrumb lists for the nodes of the scoped hierarchical data set representing the elements of the user interface.

Accordingly, the techniques presented herein may be embodied as a method of facilitating navigation in a scoped hierarchical data set representing at least one user interface component in an integrated development environment. The method comprises generating a breadcrumb list representing a path from a root node to a selected node in the scoped hierarchical data set, adding to the breadcrumb list at least one supplemental breadcrumb representing a preferred location in the scoped hierarchical data set, and displaying the breadcrumb list within the integrated development environment.

In this hierarchical data set, hierarchical scopes may be applied that associatively group some conceptually relate sets of objects in the hierarchical data set (e.g., the data set representing the components and properties that comprise the graphical user interface application.) As one example, a hierarchical scope may be applied for associatively grouping the elements of a "control template," e.g., the elements that comprise a control (e.g., a media player component may be defined by a control template specifying a Stop button, a Play button, a progress bar, etc.) As another example, a hierarchical scope may be applied for logically grouping the properties comprising a "control style," e.g., the collection of properties defining a visual style to be applied to one or more graphical components (e.g., the font, font style, background color, and border color applied to a graphical user control.) As a third example, a hierarchical scope may be applied for logically grouping the elements of a "root scene," e.g., the root node representing the graphical user interface application and its properties (e.g., its default style.) By applying these hierarchical scopes to the hierarchical data set defining the structure of the graphical user interface application under development, the integrated development environment may facilitate the programmer's navigation through the elements of the application via scoped breadcrumb lists.

Figure 7:
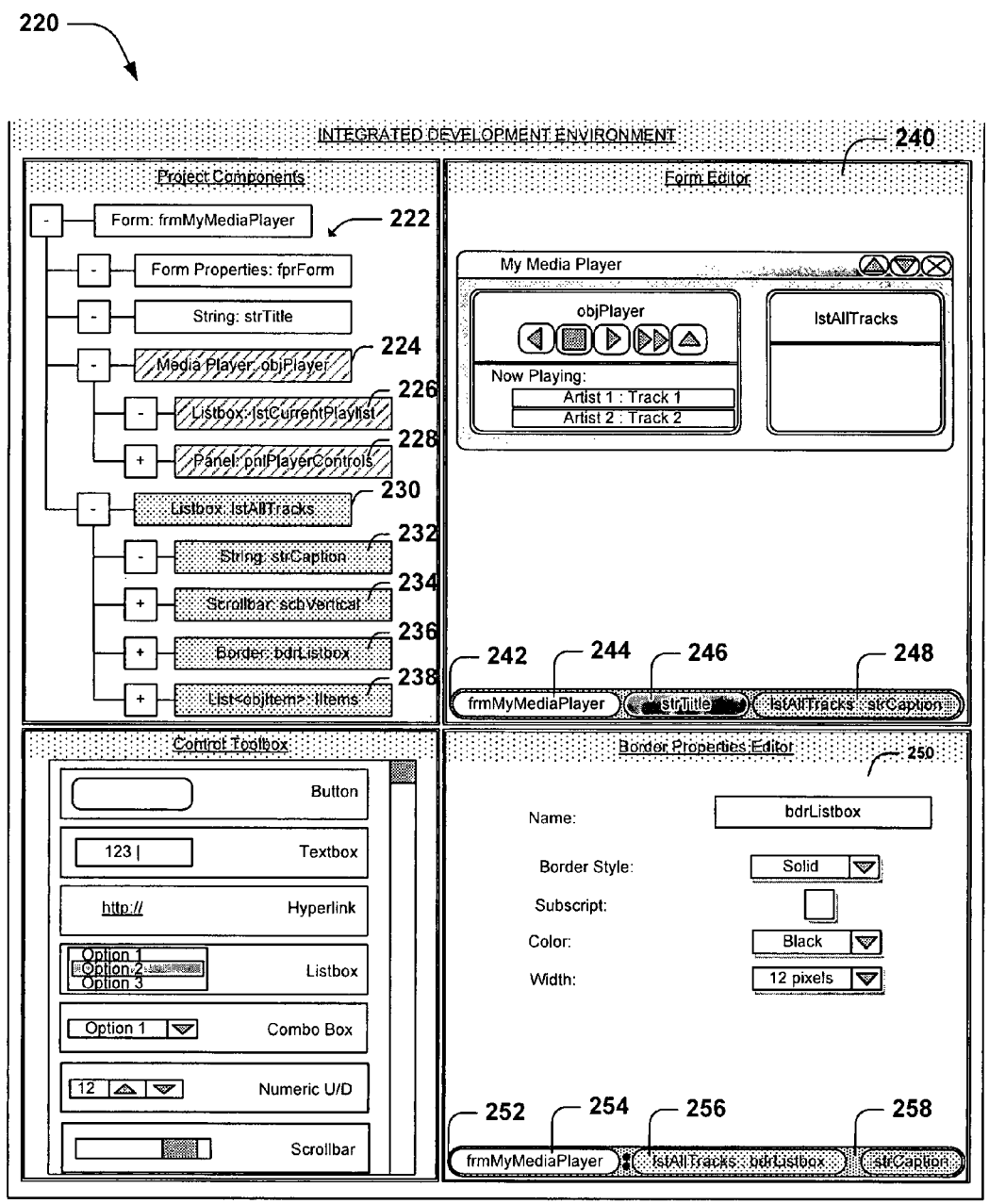
FIG. 7 is an illustration of an exemplary integrated development environment comprising a breadcrumb list such as disclosed herein.

FIG. 7 illustrates an exemplary integrated development environment 220 that features the addition of supplemental breadcrumbs to scoped breadcrumb lists generated for navigating through the complex elements that define the graphical user interface application. The exemplary integrated development environment 220 is illustrated during its use for creating a media player application. The elements of the application are shown as hierarchical nodes displayed in a treeview 222, and various hierarchical scopes are illustrated for grouping conceptually related nodes. For example, the root node of the hierarchical data set represents the form, e.g., the class comprising the graphical user interface application and containing all of the graphical user controls within the application. The root node contains a few controls, such as objPlayer 224 and 1stAllTracks 230, each of which is designed with a "control template" scope that conceptually couples each control with some of the sub-controls embedded in it. For example, "objPlayer" 224 (an instance of a media player component) shares a hierarchical scope with two sub-controls that the media player component contains: a listbox control 226 for displaying the currently playing tracks, and a panel 228 containing some media playing controls (Reverse, Stop, Play, Fast-Forward, and Eject.) Similarly, "1stAllTracks" 230 (an instance of a listbox control) shares a hierarchical scope with some of its constituent components, such as a string for the caption 232, a scrollbar for the list 234, and a border 236 for the listbox control. As in previous examples, the hierarchical scopes in this exemplary figure are represented by representative shading (a striped shading for the hierarchical scopes representing the media player control 224, 226, 228, and a stippled shading for the hierarchical scopes representing the listbox control 230, 232, 234, 236, 238.)

By including these hierarchical scopes in the hierarchical data set 222 representing the elements of the graphical user interface application, the exemplary integrated development environment 220 illustrated in FIG. 7 may construct scoped breadcrumb lists that facilitate navigation. In this exemplary environment, the developer is editing two portions of the graphical user interface application: the form (named frmMyMediaPlayer) and the border of a listbox control that contains the list of current tracks (the border portion having the name bdrListbox, and the listbox control having the name 1stAllTracks.) The form editor 240 displays a first breadcrumb list 242 at the bottom of the editor window 240, comprising a breadcrumb 244 representing the form (e.g., the root node of the hierarchical data set.) This breadcrumb list also includes two supplemental breadcrumbs: a first supplemental breadcrumb 246 representing strTitle, which comprises the title of the form, and a second supplemental breadcrumb 248 representing 1stAllTracks: strCaption, which comprises the caption of the "All Tracks" listbox control. These supplemental breadcrumbs 246, 248 are included as references to preferred locations, which may comprise previously visited or edited properties in the control set, frequently visited or edited properties \in the control set, commonly edited features of these controls, etc. The properties of the border of the listbox control are also being edited in a border properties editor 250, and a second breadcrumb list 252 is displayed at the bottom of this editor window for the border style property. In addition to the breadcrumbs 254, 256 comprising the path from the root node (e.g., the form) to the selected node (e.g., the border properties object), this second breadcrumb list 252 also includes a supplemental breadcrumb 258 representing the caption of the listbox control, which may be identified as a preferred location as a previously visited location within the hierarchical scope (e.g., for the listbox control), a commonly edited property for listbox controls, etc. It may be apparent from this illustration that the addition of supplemental breadcrumbs in breadcrumb lists facilitates navigation through the complex hierarchy to preferred locations that are logically associated with the currently selected nodes.

Figure 8:
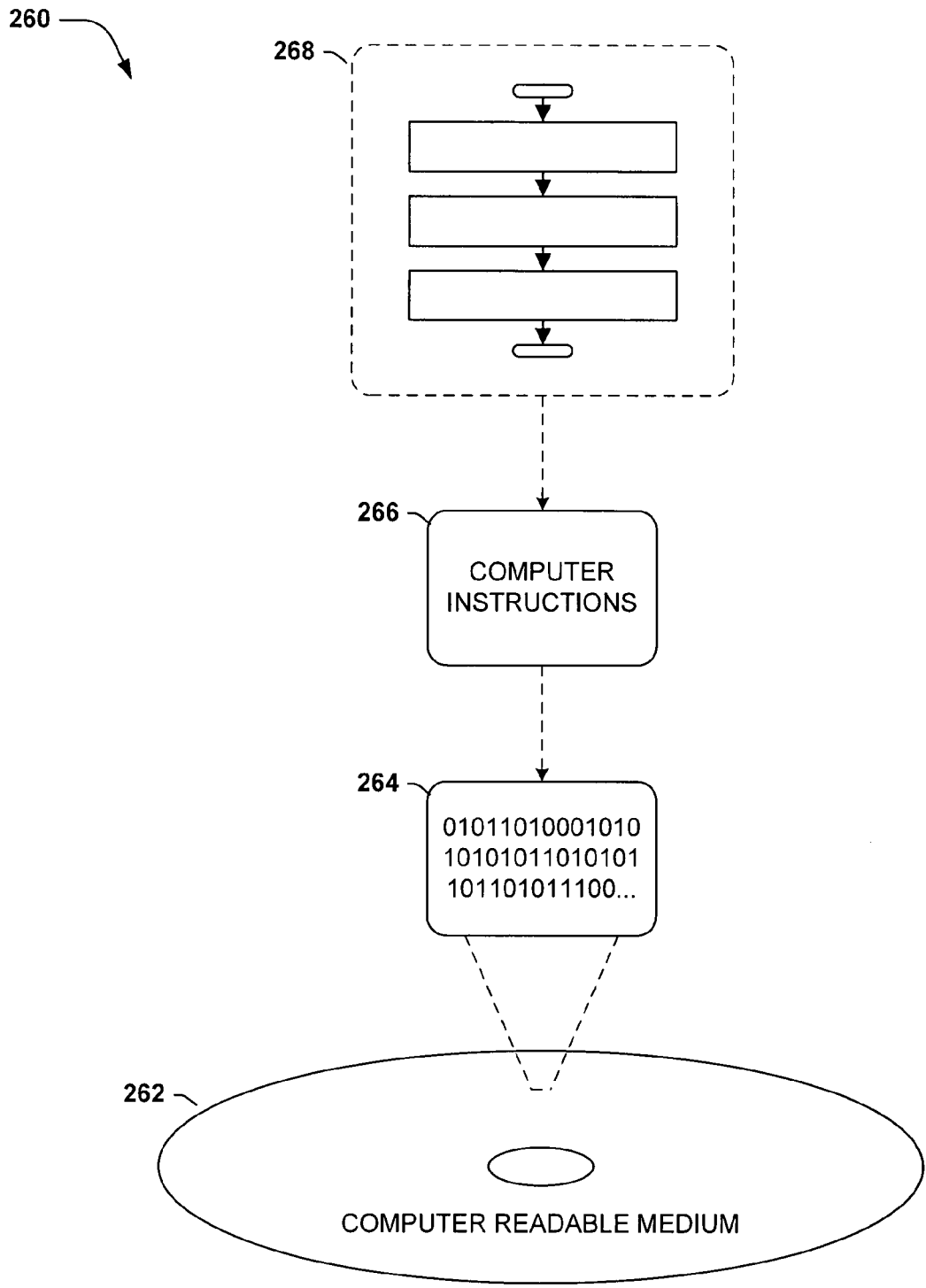
FIG. 8 is an illustration of an exemplary computer-readable medium comprising processor-executable instructions configured to perform a method such as disclosed herein.

The techniques discussed herein may also be embodied as a computer-readable medium comprising processor-executable instructions configured to generate breadcrumb lists as discussed herein. An exemplary computer-readable medium that may be devised in these ways is illustrated in FIG. 8, wherein the implementation 260 comprises a computer-readable medium 262 (e.g., a CD-R, DVD-R, or a platter of a hard disk drive), on which is encoded computer-readable data 264. This computer-readable data 264 in turn comprises a set of processor-executable instructions 266 configured to operate according to the principles set forth herein. In one such embodiment, the processor-executable instructions 266 may be configured to perform a method of facilitating navigation in a hierarchical data set by generating a breadcrumb list, adding at least one supplemental breadcrumb, and displaying the breadcrumb list, such as the method illustrated in the flowchart of FIG. 2. In another such embodiment, the processor-executable instructions 266 may be configured to implement a system for facilitating navigation in a hierarchical data set, such as the system illustrated in the component diagram of FIG. 6. In yet another such embodiment, the processor-executable instructions 266 may be configured to implement a method 268 of facilitating navigation in a hierarchical data set representing at least one user interface component in an integrated development environment, such as the integrated development environment illustrated in FIG. 7. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of facilitating navigation in a hierarchical data set, the method comprising:
   generating a breadcrumb list representing a path from a root node to a selected node in the hierarchical data set;
   adding to the breadcrumb list at least one supplemental breadcrumb representing a preferred location in the hierarchical data set, the preferred location selected from a preferred location set comprising:
      at least one node of the hierarchical data set that is conceptually related to the selected node; and
      at least one node of the hierarchical data set having a relationship with at least one user; and
   displaying the breadcrumb list.

2. The method of claim 1, the preferred location of at least one node of hierarchical data set having a relationship with at least one user comprising: a node of the hierarchical data set representing a previously visited location that has been previously visited by a user.

3. The method of claim 2, the previously visited location comprising a previously visited location within the hierarchical data set that is subordinate to the selected node.

4. The method of claim 3,
   respective nodes of the hierarchical data set configured to record in a subordinate node visit memory the visited subordinate nodes of the selected node, and the breadcrumb list comprising supplemental breadcrumbs representing the visited subordinate nodes represented in the subordinate node visit memory of the selected node.

5. The method of claim 2:
the hierarchical data set comprising a scoped hierarchical data set; and
the previously visited location comprising a previously visited location within the hierarchical scope of the selected node.

6. The method of claim 1, the preferred location comprising a frequently visited location within the hierarchical data set.

7. The method of claim 6, the hierarchical data set comprising a scoped hierarchical data set, the frequently visited location comprising a frequently visited location that shares the hierarchical scope of the selected node.

8. The method of claim 1, the displaying comprising displaying a supplemental breadcrumb indicator configured to toggle displaying the at least one supplemental breadcrumb.

9. The method of claim 1, the displaying comprising displaying a supplemental breadcrumb indicator configured to toggle displaying the at least one supplemental breadcrumb.

10. The method of claim 1:
the selected node selected by a user; and
the at least one node of the hierarchical data set that has been previously visited by a user comprising: at least one node of the hierarchical data set that has been previously visited by the user selecting the selected node.

11. The method of claim 1, displaying the breadcrumb list comprising:
displaying the breadcrumb list as a one-dimensional list of breadcrumbs including the at least one supplemental breadcrumb.

12. A computer-readable storage medium storing processor-executable instructions configured to facilitate navigation in a hierarchical data set by:
generating a breadcrumb list representing a path from a root node to a selected node in the hierarchical data set;
adding to the breadcrumb list at least one supplemental breadcrumb representing a preferred location in the hierarchical data set, the preferred location selected from a preferred location set comprising:
at least one node that is conceptually related to the selected node; and
at least one node having a relationship with at least one user; and displaying the breadcrumb list.

13. A method of facilitating navigation in a hierarchical data set, the method comprising:
generating a breadcrumb list representing a path from a root node to a selected node in the hierarchical data set;
appending to the breadcrumb list at least one supplemental breadcrumb representing a preferred location in the hierarchical data set; and
displaying the breadcrumb list as a one-dimensional sequence of breadcrumbs appending the at least one supplemental breadcrumb.

14. The method of claim 13, the one-dimensional list of breadcrumbs comprising a horizontally ordered series of breadcrumbs.

15. The method of claim 13, at least one preferred location represented by at least one supplemental breadcrumb comprising a location of at least one node of the hierarchical data set that is conceptually related to the selected node.

16. The method of claim 13, the preferred location of at least one node of the hierarchical data set having a relationship with at least one user comprising: a node of the hierarchical data set representing a previously visited location that has previously visited by a user.

17. The method of claim 13, at least one preferred location represented by at least one supplemental breadcrumb comprising a location of at least one node of the hierarchical data set having a relationship with at least one user.

18. The method of claim 13, at least one breadcrumb of the breadcrumb list representing at least two nodes of the hierarchical data set.

19. A computer-readable storage medium storing processor-executable instructions configured to facilitate navigation in a hierarchical data set by:
generating a breadcrumb list representing a path from a root node to a selected node in the hierarchical data set;
appending to the breadcrumb list at least one supplemental breadcrumb representing a preferred location in the hierarchical data set; and
displaying the breadcrumb list as a one-dimensional sequence of breadcrumbs appending the at least one supplemental breadcrumb.

* * * * *

UNITED STATES PATENT AND TRADEMARK OFFICE
CERTIFICATE OF CORRECTION

PATENT NO. : 8,010,910 B2  Page 1 of 1
APPLICATION NO. : 11/899020
DATED : August 30, 2011
INVENTOR(S) : Dawn Wright et al.

It is certified that error appears in the above-identified patent and that said Letters Patent is hereby corrected as shown below:

In column 16, line 57, in Claim 2, delete "of" and insert -- of the --, therefor.

In column 16, line 64, in Claim 4, delete "3," and insert -- 3: --, therefor.

In column 16, line 67, in Claim 4, delete "node," and insert -- node; --, therefor.

Signed and Sealed this
Eighteenth Day of October, 2011

David J. Kappos
*Director of the United States Patent and Trademark Office*